(12) United States Patent
Lefebvre et al.

(10) Patent No.: US 10,844,745 B2
(45) Date of Patent: Nov. 24, 2020

(54) BEARING ASSEMBLY

(71) Applicant: PRATT & WHITNEY CANADA CORP., Longueuil (CA)

(72) Inventors: Guy Lefebvre, St-Bruno-de-Montarville (CA); Remy Synnott, St-Jean-sur Richelieu (CA)

( * ) Notice: Subject to any disclaimer, the term of this patent is extended or adjusted under 35 U.S.C. 154(b) by 0 days.

(21) Appl. No.: 16/369,647

(22) Filed: Mar. 29, 2019

(65) Prior Publication Data

US 2020/0308983 A1 Oct. 1, 2020

(51) Int. Cl.
| | |
|---|---|
| F16C 19/08 | (2006.01) |
| F16C 19/16 | (2006.01) |
| F16C 19/38 | (2006.01) |
| F16C 25/08 | (2006.01) |
| F01D 9/04 | (2006.01) |
| F01D 5/02 | (2006.01) |
| F01D 25/16 | (2006.01) |
| F16C 19/52 | (2006.01) |

(52) U.S. Cl.
CPC ........... *F01D 25/164* (2013.01); *F01D 9/041* (2013.01); *F16C 19/08* (2013.01); *F16C 19/38* (2013.01); *F16C 19/52* (2013.01); *F01D 5/027* (2013.01); *F05D 2220/32* (2013.01); *F05D 2240/54* (2013.01); *F05D 2240/91* (2013.01); *F05D 2260/15* (2013.01); *F16C 19/16* (2013.01); *F16C 2360/23* (2013.01)

(58) Field of Classification Search
CPC .......... F19C 19/08; F16C 19/16; F16C 19/38; F16C 19/42; F16C 19/52; F16C 19/54; F16C 25/08; F16C 2360/23; F01D 9/041; F01D 5/027; F01D 25/164; F05D 2220/32; F05D 2240/54; F05D 2240/91; F05D 2260/15
USPC ......... 384/495, 504, 535; 415/9, 229; 403/2; 60/226.1, 797, 799
See application file for complete search history.

(56) References Cited

U.S. PATENT DOCUMENTS

| | | | |
|---|---|---|---|
| 4,304,522 A | 12/1981 | Newland | |
| 5,433,584 A | 7/1995 | Amin et al. | |
| 5,603,602 A | 2/1997 | Romani | |
| 6,109,022 A | 8/2000 | Allen et al. | |
| 6,240,719 B1 * | 6/2001 | Vondrell | F01D 21/04 60/223 |
| 6,428,269 B1 * | 8/2002 | Boratgis | F01D 21/045 411/2 |
| 6,447,252 B1 | 9/2002 | Barker et al. | |
| 6,494,032 B2 * | 12/2002 | Udall | F01D 21/045 415/9 |

(Continued)

FOREIGN PATENT DOCUMENTS

| | | | | |
|---|---|---|---|---|
| CA | 3000360 A1 | * 10/2018 | ............. | F16C 19/54 |
| EP | 1489268 B1 | 12/2009 | | |
| WO | WO-2013184429 A1 | * 12/2013 | ............. | F01D 25/16 |

*Primary Examiner* — Marcus Charles

(57) ABSTRACT

There is disclosed a bearing assembly for a gas turbine engine. The bearing assembly has a central axis and includes at least two bearings being axially spaced from one another relative to the central axis and configured to rotatably support a rotating component of the gas turbine engine. A bearing housing includes bearing supports supporting the at least two bearings. The bearing housing is securable to a casing of the gas turbine engine via hairpin structures being axially spaced from one another.

20 Claims, 5 Drawing Sheets

(56) References Cited

U.S. PATENT DOCUMENTS

| | | | |
|---|---|---|---|
| 6,679,045 B2 | 1/2004 | Karafillis et al. | |
| 6,786,642 B2 | 9/2004 | Dubreuil et al. | |
| 6,846,158 B2 * | 1/2005 | Hull | F01D 25/164 384/99 |
| 7,100,358 B2 | 9/2006 | Gekht et al. | |
| 7,195,444 B2 * | 3/2007 | Brault | F01D 21/045 415/9 |
| 7,448,808 B2 * | 11/2008 | Bouchy | F01D 21/04 384/495 |
| 7,452,152 B2 * | 11/2008 | Bouchy | F01D 21/045 403/2 |
| 7,565,796 B2 * | 7/2009 | Eleftheriou | F01D 25/162 415/9 |
| 7,793,488 B2 * | 9/2010 | Eleftheriou | F01D 5/22 415/213.1 |
| 7,802,962 B2 * | 9/2010 | Sjoqvist | F01D 25/162 415/142 |
| 7,950,236 B2 | 5/2011 | Durocher et al. | |
| 8,061,969 B2 | 11/2011 | Durocher et al. | |
| 8,099,962 B2 | 1/2012 | Durocher et al. | |
| 8,128,339 B2 | 3/2012 | Kondo et al. | |
| 8,245,518 B2 | 8/2012 | Durocher et al. | |
| 8,282,285 B2 | 10/2012 | Brillon | |
| 8,337,090 B2 | 12/2012 | Herborth et al. | |
| 8,534,076 B2 | 9/2013 | Woodcock et al. | |
| 8,777,490 B2 | 7/2014 | Cazaux et al. | |
| 9,194,253 B2 | 11/2015 | Dijoud et al. | |
| 9,447,817 B2 | 9/2016 | Gallimore et al. | |
| 9,476,320 B2 * | 10/2016 | Savela | F01D 25/164 |
| 9,664,059 B2 | 5/2017 | Feldmann et al. | |
| 9,702,404 B2 | 7/2017 | Smedresman et al. | |
| 9,829,037 B2 | 11/2017 | Gallimore et al. | |
| 9,945,259 B2 | 4/2018 | Cigal et al. | |
| 10,196,986 B2 | 2/2019 | Fang et al. | |
| 10,267,176 B2 | 4/2019 | Otto et al. | |
| 10,415,481 B2 | 9/2019 | Grogg et al. | |
| 10,436,065 B2 | 10/2019 | DiBenedetto | |
| 10,502,081 B2 | 12/2019 | Bioud et al. | |
| 10,513,938 B2 | 12/2019 | Witlicki et al. | |
| 10,519,804 B2 | 12/2019 | Van Den Berg | |
| 10,519,863 B2 | 12/2019 | Roach et al. | |
| 2008/0063333 A1 | 3/2008 | Bruno et al. | |
| 2010/0242494 A1 | 9/2010 | Mulcaire | |
| 2017/0198604 A1 | 7/2017 | Lefebvre et al. | |
| 2019/0195088 A1 | 6/2019 | Duffy et al. | |
| 2019/0353051 A1 | 11/2019 | Ganiger et al. | |

\* cited by examiner

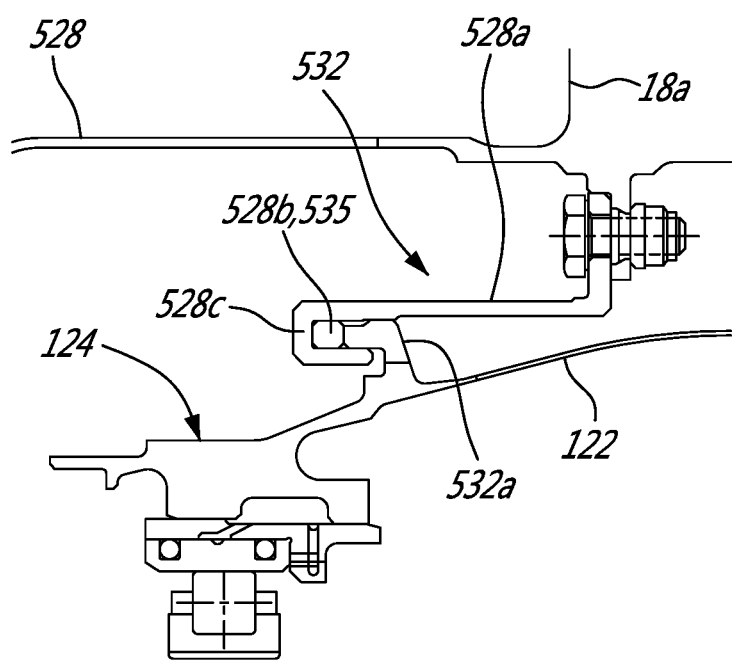

US 10,844,745 B2

BEARING ASSEMBLY

TECHNICAL FIELD

The application relates generally to gas turbine engines and, more particularly, to bearing housing assemblies used in such engines.

BACKGROUND OF THE ART

In a gas turbine engine, a rotary shaft holding compressor/fan and turbine blades is rotatably mounted within a casing via bearings. The bearings are typically located radially inwards relative to the annular flow path formed by duct walls of the casing. A bearing housing usually encloses the bearings and defines a bearing cavity for receiving lubricant for lubricating the bearings. Due to the forces inherent to gas turbine engine operation, and as they are the interface between shafts and a support structure, the bearings are exposed lo loads, vibrations, etc that may affect their performance over time.

SUMMARY

In one aspect, there is provided a bearing assembly for a gas turbine engine, the bearing assembly having a central axis and comprising at least two bearings being axially spaced from one another relative to the central axis and configured to rotatably support a rotating component of the gas turbine engine, a bearing housing including bearing supports supporting the at least two bearings, the bearing housing securable to a casing of the gas turbine engine via hairpin structures being axially spaced from one another.

In another aspect, there is provided a gas turbine engine comprising a bearing housing having a central axis and two bearings within the bearing housing axially spaced from one another relative to the central axis, the bearing housing secured to a casing of the gas turbine engine via a plurality of axially spaced hairpin structures.

In yet another aspect, there is provided a method of operating a bearing assembly of a gas turbine engine, comprising supporting at least two bearings via bearing supports of a bearing housing being axially spaced apart relative to a central axis; receiving a first load at least at one of the at least two bearings and receiving a second load greater than the first load at the other of the at least two bearings; and moving the bearing supports relative to one another with annular hairpin structures connecting the bearing housing to attachment members of a casing of the gas turbine engine and/or with the attachment members of the casing.

DESCRIPTION OF THE DRAWINGS

Reference is now made to the accompanying figures in which:

FIG. 8 is a schematic cross-sectional view of a portion of a bearing housing in accordance with another embodiment.

DETAILED DESCRIPTION

Figure 1:
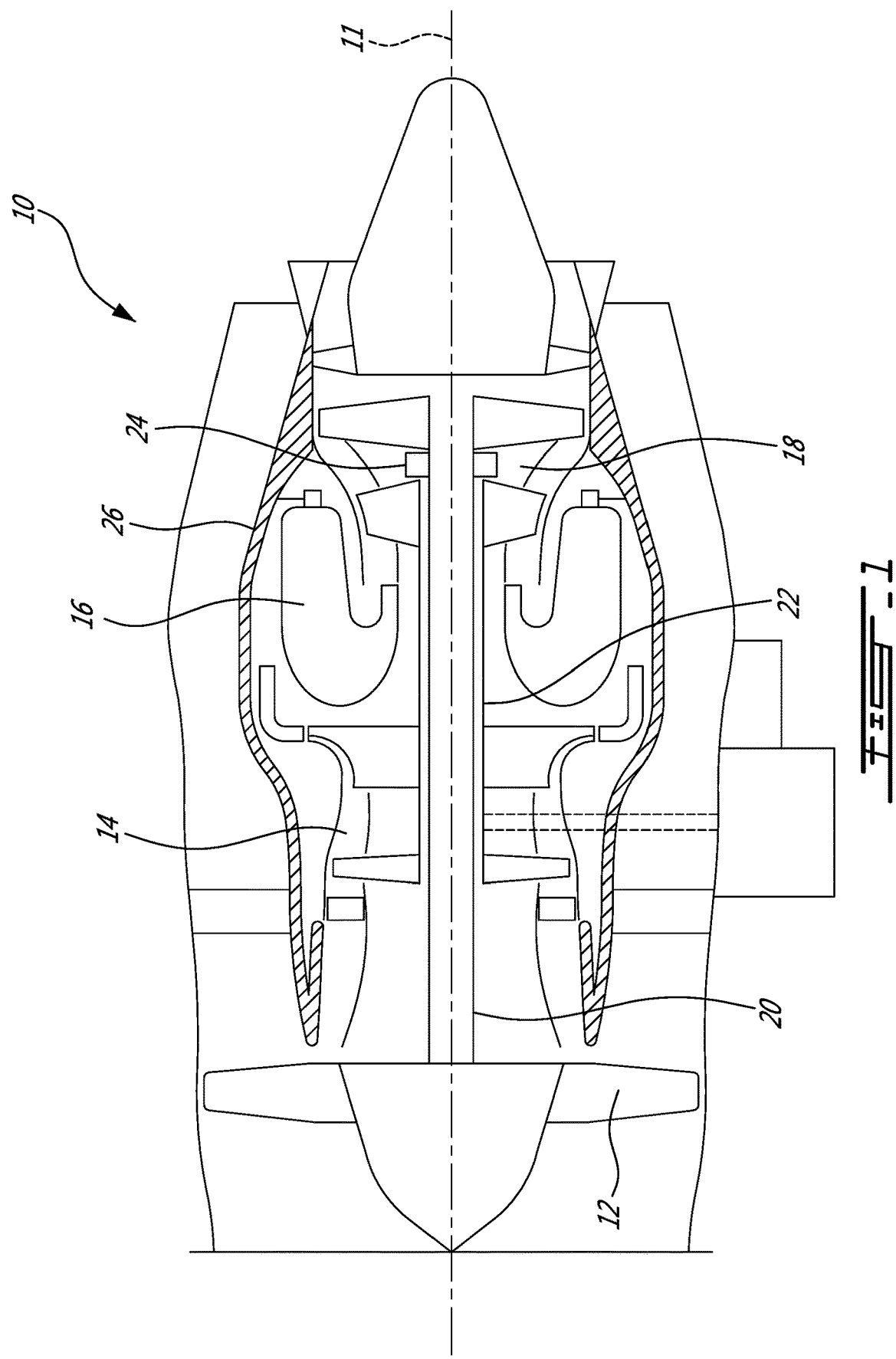
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14, and the turbine section 18 are rotatable about a central axis 11.

The compressor section 14, fan 12 and turbine section 18 have rotating components which can be mounted on one or more shafts 20, 22, which, in this embodiment, rotate concentrically around the central axis 11. Bearings 24 are used to provide smooth relative rotation between a shaft (20 or 22) and casings 26, 28 (FIG. 2), and/or between the two shafts 20, 22 which rotate at different speeds.

Figure 2:
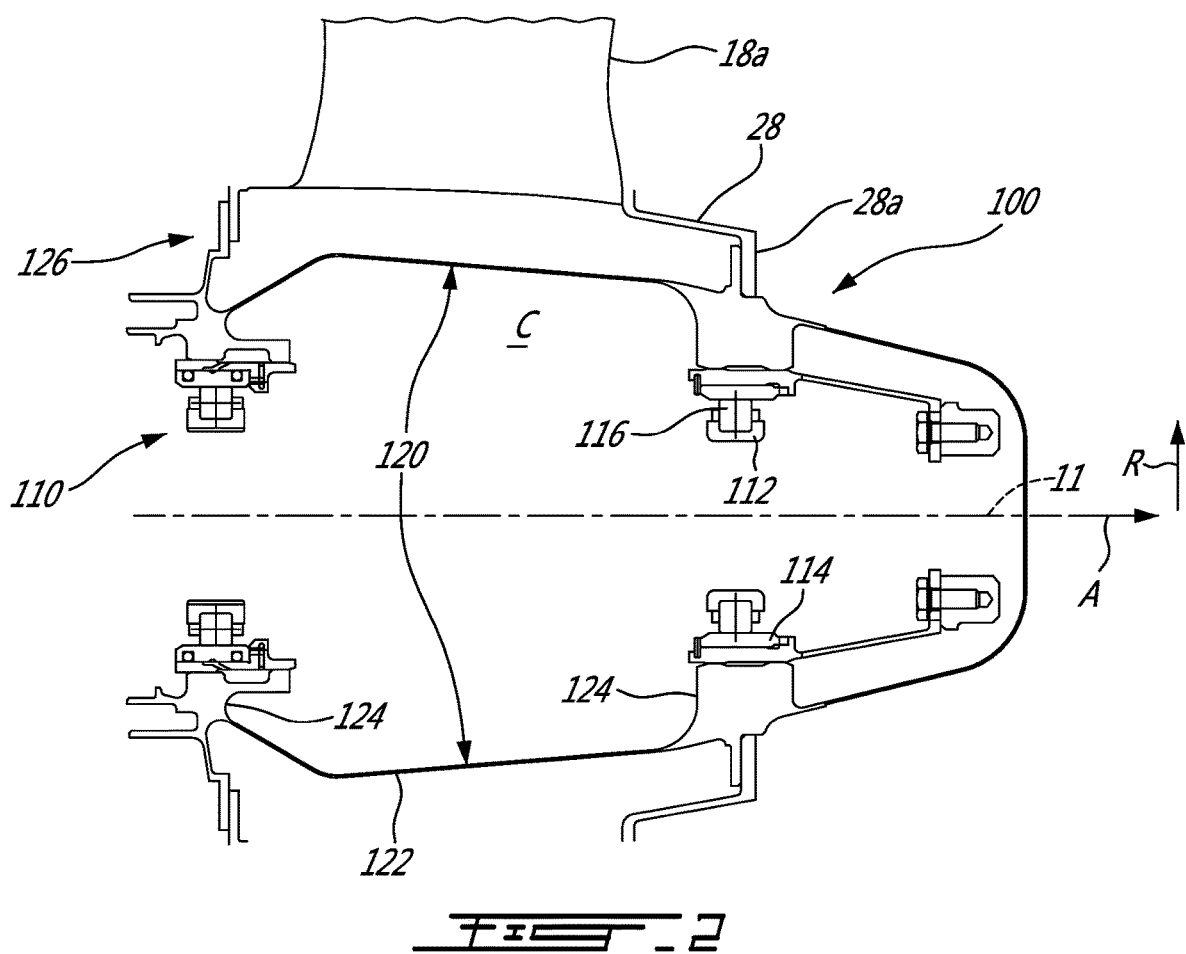
FIG. 2 is a schematic cross-sectional view of a portion of the gas turbine engine of FIG. 1 in accordance with one embodiment.

Referring now to FIG. 2, a cross-sectional view of a portion of the turbine section 18 is illustrated. A bearing assembly is generally shown at 100. The bearing assembly 100 is located radially inwardly of vanes 18a of the turbine section 18 relative to the central axis 11.

The bearing assembly 100 includes bearings 110 and a bearing housing 120 enclosing the bearings 110. The bearing housing 120 is used for defining a bearing cavity C circumferentially extending around the central axis 11. The bearing cavity C is used for receiving lubricant from a lubrication system for lubricating the bearings 110. The bearing 110 and the bearing housing 120 are described in succession herein below.

Still referring to FIG. 2, two bearings 110 are shown and are axially offset from each other relative to the central axis 11. It is understood that the gas turbine engine 10 may include more than two bearings. For the sake of clarity, only one of the two bearings 110 is described herein below using the singular form, but the description may apply to both of the bearings 110.

The bearing 110 is used to allow a rotation of the shaft 22 relative to the bearing housing 120 and to substantially maintain a radial position of the shaft 22 relative to the casing 28 of the gas turbine engine 10. The bearing 110 may include an inner race 112 secured to the shaft 20, an outer race 114 secured to the bearing housing 120 and/or rolling elements 116 located radially between the inner and outer races 112, 114. The rolling elements 116 may be spherically, cylindrically, frustoconically shaped, among examples. Any suitable bearing known in the art may be used.

Since the shaft 22 may rotate at a relatively high speed relative to the casing 26, proper lubrication of the bearings 110 may be required. As aforementioned, the lubrication system injects the lubricant within the bearing cavity C. It might be desirable to keep the lubricant within the bearing cavity C. This function may be carried by the bearing housing 120 and sealing members (not shown).

In the depicted embodiment, the bearing housing 120 includes a case 122 that circumferentially extends all around the central axis 11. The case 122 extends axially relative to the axis 11 and may span a distance between the two bearings 110. In the embodiment shown, an axial distance relative to the central axis between the two bearings 110 is greater than a chord length of the vane 18a. The axial distance may be at least as great as a diameter of the shaft.

Two bearing supports 124 (more may be present if more bearings are present) are secured at axial extremities of the case 122. Each of the two bearing supports 124 is in engagement with a respective one of the outer races 114 of the bearings 110. The two bearing supports 124 are stiffer than the case 122 to be able to withstand loads applied thereto from the shaft 22 (FIG. 1) via the bearings 110. In the embodiment shown, a radial thickness of the two bearing supports 124 is greater than that of the case 122. The bearing supports 124 and the case 122 may be monolithic.

In some cases, it might be advantageous to vary the stiffness of the two bearing supports 124 of the bearing housing 120. However, increasing the stiffness of one of the two bearing supports 124 may indirectly increase that of the other. Moreover, if the two bearing supports 124 of the bearing housing 120 vary in their respective stiffness, they might react differently to temperature variation. In other words, if the bearing housing 120 is installed in the turbine section 18, one of the two bearing supports 124 might subjected to different thermal expansion than the other which might include thermal stresses. This phenomenon may be enhanced by the high temperature gradients in the turbine section 18. More specifically, the casing 28 might be more affected to the temperature of exhaust gases circulating in the turbine section 18 than the bearing housing 120 as the casing 28 is closer to the exhaust gases. This might create thermal stress.

Figure 3:
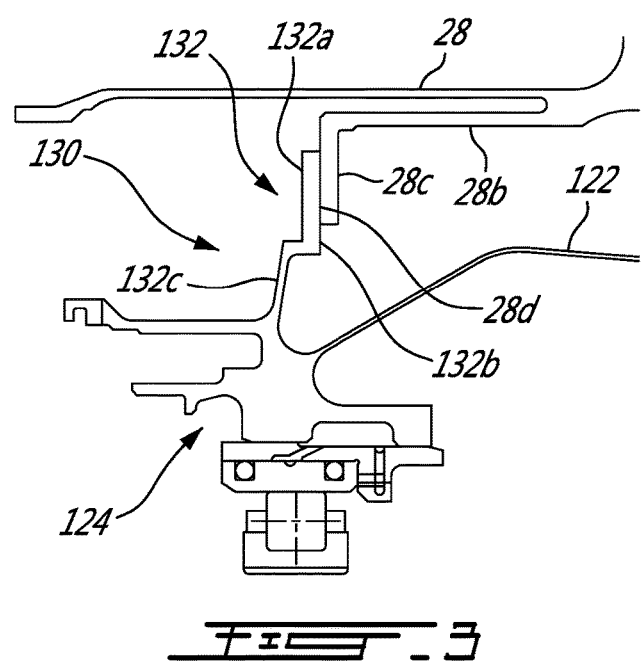
FIG. 3 is an enlarged view of a portion of FIG. 2.
Figure 4:
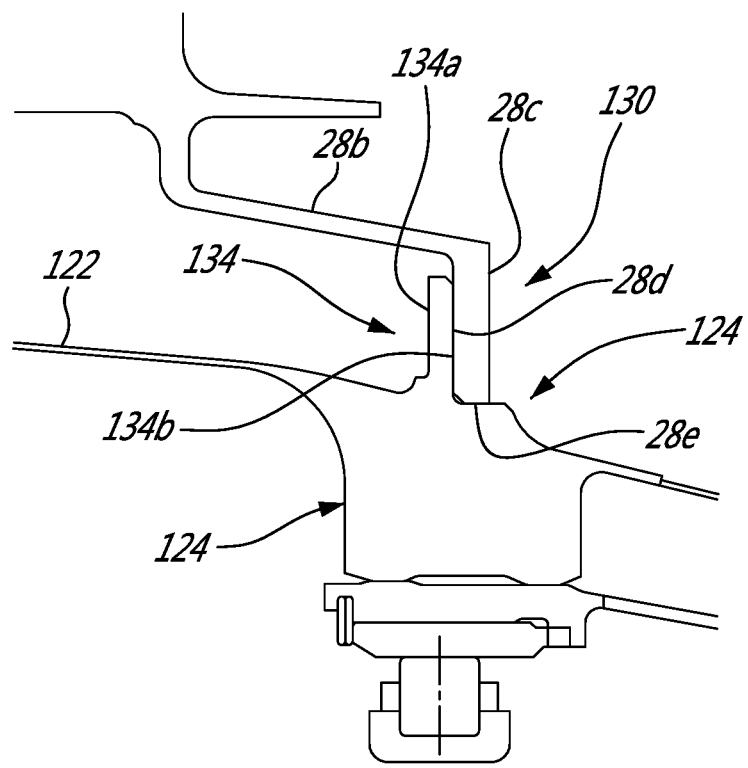
FIG. 4 is an enlarged view of another portion of FIG. 2.

Referring to FIGS. 2-4, attachment members 28a project from the casing 28 of the gas turbine engine 10, and are used as interfaces for the bearing assembly 100. The attachment members 28a may be integrally part of the casing 28, or may be connected to the casing 28 in any appropriate way. Each of the attachment members 28a has a free end cantilevered about the casing 28. In the embodiment shown, each of the attachment members 28a includes an axial section 28b and a radial section, or casing flange, 28c. The axial section 28b is secured at one end to a tubular portion of the casing 28 and at the other end to the casing flange 28c. The two axial sections 28b extend substantially axially and away from each other relative to the central axis 11. The casing flanges 28c are movable in a radial direction relative to the central axis 11 via flexion of the axial sections 28b of the attachment members 28a. The casing flanges 28c defines annular faces 28d oriented axially relative to the central axis 11.

The bearing housing 120 further includes an annular hairpin structure 130 defined by the bearing housing 120 for securing the bearing housing 120 to the casing 28 of the gas turbine engine 10. In the embodiment shown, the structure 130 includes connecting members, more specifically fore and aft connecting members 132, 134, each of which being described herein below. It is understood that the fore and aft connecting members 132, 134 may be reversed, that is, positions of the fore and aft connecting members 132, 134 may be interchanged.

Referring to FIGS. 2-3, the fore connecting member 132 may include a flange 132a or like annular wall that defines an annular face 132b oriented in an axial direction A relative to the central axis 11. The annular face 132b of the flange 132a of the fore connecting member 132 is in abutment with the annular face 28d of one of the casing flanges 28c. The flange 132a may be axially aligned with one of the bearings 110.

In the depicted embodiment, the flange 132a of the fore connecting member 132 is connected to one of the bearing support 124 via a fore flexible connector 132c. The fore flexible connector 132c may extend substantially along a radial direction R relative to the central axis 11 between the bearing support 124 and the flange 132a. The fore flexible connector 132c may be flexible to allow axial movements of the flange 132a relative to the bearing support 124.

Referring to FIGS. 2 and 4, the aft connecting member 134 protrudes radially outwardly from the other of the bearing supports 124 and includes a flange 134a or like annular wall that defines an annular face 134b oriented in the axial direction A relative to the central axis 11. The annular face 134b of the flange 134a of the aft connecting member 134 is in abutment with the annular face 28d of the other of the casing flanges 28c. The flange 134a may be axially aligned with the other of the bearings 110.

Radial movements of the bearing supports 124 and of the fore and aft connecting members 132, 134 secured thereto may be allowed by the axial sections 28b of the attachment members 28 of the casing 28.

The flanges 132a, 134a of the connecting members 132, 134 may be secured to the casing flanges 28c with an axial interference fit or with an axial loose fit.

In the depicted embodiment, a tip of the casing flange 28c defines an annular face 28e oriented radially inwardly and is in abutment against the bearing support 124. The annular face 28e of the casing flange 28c may radially support the bearing support 124. Such an engagement is referred to as a spigot fit. In a particular embodiment, the spigot fit may not be present.

The flanges 132a, 134a of the fore and aft connecting members 132, 134 may extend all around the central axis 11. The flanges 132a, 134a may be secured to the casing flanges 28c by any suitable mean, such as, via fasteners, brazing, and/or welding. In a particular embodiment, an interference fit and/or a spigot fit may be used in combination with, or in replacement of, fasteners or weld/braze joint(s). The bearing housing 120, including the case 122, the bearing supports 124, and the connecting members 132, 134 may be made of, or include, SST materials, Waspalloy™, or a combination of SST materials and Waspalloy™. In a particular embodiment, the connecting members and/or the attachment members may be designed/calibrated to react as frangible joint(s) to cater to a bearing seizure or an ultimate radial load. The flanges of the connecting and attachment members may act as frangible joint(s).

Herein "frangible" implies that the flanges are designed, or calibrated, to break upon application of the threshold load. The flanges may be dimensioned so that the threshold load causes their rupture. A weakness zone may be defined by the flanges. The weakness zone may be a zone characterized by a thickness of material less than that at locations different than the weakness. Alternatively, the weakness zone may be made of a different, less resistant, material than a remainder of the flanges. Alternatively, the weakness zone may be a location on the flanges where holes or apertures are defined such that less material is available to resist the load. Alternatively, a cross-sectional area of the flanges at the weakness zone may be less than that outside said weakness zone. Any combinations of the above is contemplated without departing from the scope of the present disclosure. In a particular embodiment, the flange is designed to act like a fuse in case of a bearing seizure or ultimate loads such as shaft shear or multiple blade-off case. In other words, the flange might break first in such situations in order to avoid any load transmitted to engine mounts (e.g., the casing of the gas turbine engine). There are many ways to make a frangible joint, such as, for instance, selecting a quantity of bolts that secures the flange, using a thin wall for the flange, dog and slot arrangement designed to break at the desirable ultimate load. Any ways used to create frangible joint may be used without departing from the scope of the present disclosure.

Figure 5:
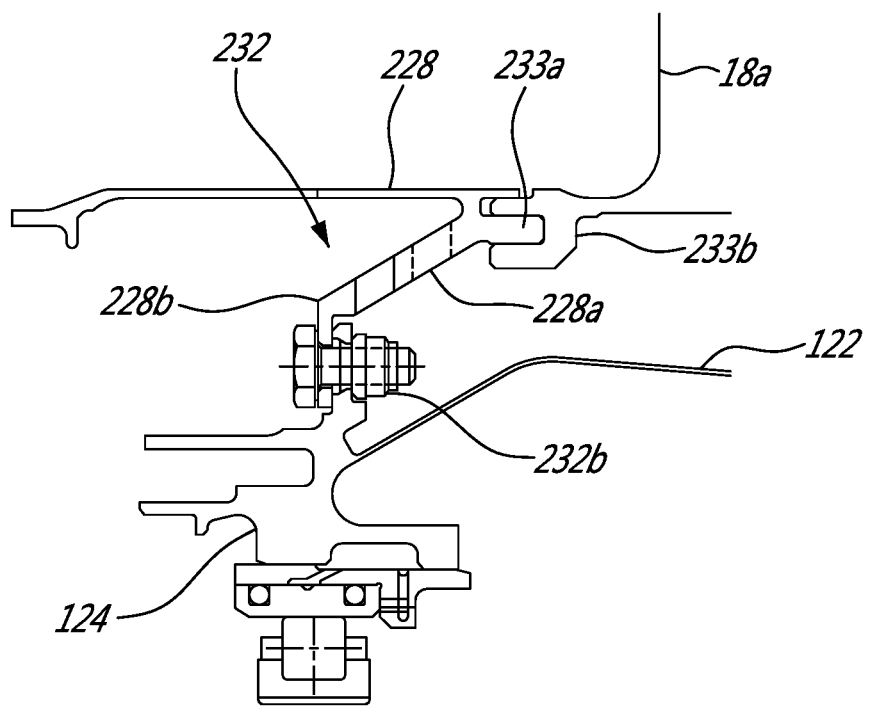
FIG. 5 is a schematic cross-sectional view of a portion of a bearing housing in accordance with another embodiment.

Referring to FIG. 5, another embodiment of a fore connecting member and casing are generally shown at 232 and 228, respectively.

An attachment member 228a is secured to the casing 228 and extends in both the radial and axial directions toward the bearing support 124 to define a flange 228b or like annular wall at its extremity. The flange 228b is secured to the flange 232b of the fore connecting member 232. One of the attachment members 228b and the casing 228 defines a male connector 233a, such as an annular protrusion, whereas the other of the attachment members 228b and the casing 228 defines a female connector 233b, such as a groove, matingly engageable by the male connector. In the embodiment shown, the male connector 233a is moved in the axial direction A to engage the female connector 233b. Therefore, axial movements of the bearing support 124 relative to the casing 228 may be permitted via the sliding engagement between the male and female connectors 233a, 233b. Radial movements of the bearing support 124 relative to the casing 228 may be permitted by bending the attachment member 228a.

Figure 6:
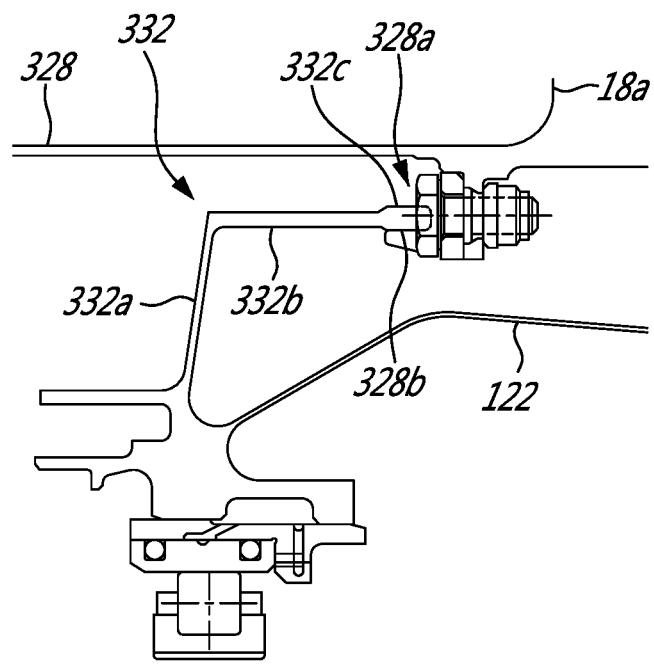
FIG. 6 is a schematic cross-sectional view of a portion of a bearing housing in accordance with another embodiment.

Referring to FIG. 6, another embodiment of a fore connecting member and casing are generally shown at 332 and 328, respectively.

An attachment member 328a is secured to the casing 228 and defines an annular abutment face 328b that may face radially outwardly. The fore connecting member 332 defines a first section 332a, which substantially extends radially outwardly from the bearing support 124, and a second section 332b, which extends substantially axially from the first section 332a to a remote end 332c. The remote end 332c may be ring shaped and is in abutment against the annular abutment face 328b of the attachment member 328a. A sliding engagement is defined between the remote end 332c of the fore connecting member 332 and the attachment member 328a that may allow axial movements of the bearing support 124 relative to the casing 328.

Figure 7:
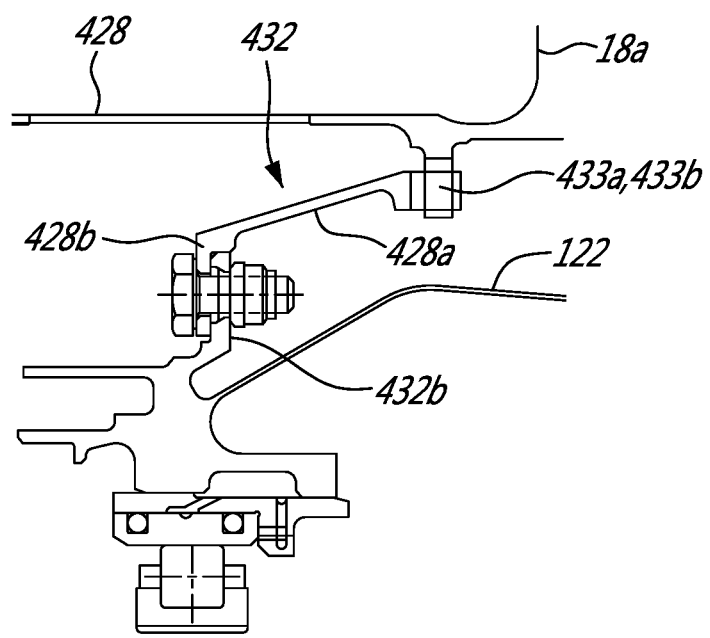
FIG. 7 is a schematic cross-sectional view of a portion of a bearing housing in accordance with another embodiment.

Referring to FIG. 7, another embodiment of a fore connecting member and casing are generally shown at 432 and 428, respectively.

An attachment member 428a is secured to the casing 428 and extends in both the radial and axial directions toward the bearing support 124 to define a flange 428b or like annular wall at its extremity. The flange 428b is secured to the flange 432b of the fore connecting member 432. A dog 433a and slot 433b configuration is defined between the attachment member 428a and the casing 428. In the embodiment shown, axial movements of the bearing support 124 relative to the casing 428 may be permitted via a sliding engagement between the dogs 433a and the slots 433b defined by the attachment members 428a and the casing 428. Radial movements of the bearing support 124 relative to the casing 428 may be permitted by bending the attachment member 428a and/or by rotating movements of the dogs 433a within the slots 433b.

Referring to FIG. 8, another embodiment of a fore connecting member and casing are generally shown at 532 and 528, respectively.

An attachment member 528a is secured to the casing 528 and extends substantially in the axial direction A toward the bearing support 124. A groove 528b is defined at a remote end 528c of the attachment member 528a. The fore connecting member 532 defines a hook 532a secured to the bearing support 124. The hook 532a is slidingly received within the groove 528b of the attachment member 528a. The hook and the groove 532a, 528b are movable one relative to the other in the axial direction A such that movements of the bearing support 124 relative to the casing 528 may be permitted. In the embodiment shown, an axial spacer 535, which may annularly extend all around the central axis 11, is located within the groove 528b between the remote end 528c and the hook 523a. The axial spacer 535 may cater for an axial stack up of tolerances when assembling different elements of the gas turbine engine 10.

For operating the bearing assembly 100, the bearings 110 are supported via the bearing supports 124 of the bearing housing 120; a first load is received at least at one of the at least two bearings 110 and a second load greater than the first load is received at the other of the at least two bearings; and the bearing supports 120 are moved relative to one another with the annular hairpin structure 130 connecting the bearing housing to the attachment members 28a of the casing 28 of the gas turbine engine 10 and/or with the attachment members 28a of the casing 28. In the embodiment shown, relative radial movements between the bearing supports 124 are allowed.

In a particular embodiment, the hairpin structure with two connecting members allows independent adjustment of radial stiffness of the bearing housing without compromising exhaust flexibility and overall weight by eliminating a massive single connection. In a particular embodiment, the use of SST material(s) with Waspalloy™ for for the exhaust cases or other components minimizes axial thermal displacement in any engine conditions or adverse condition. As aforementioned, one of the flanges 132a, 134a of the connecting members 132, 134 may be designed to accommodate axial thermal displacement while the other of the flanges may be designed for a radial hairpin flex joint. The disclosed hairpin structure 130 might allow the bearing housing 120 to meet the stiffness and loads requirements while maintaining a low weight compared to a configuration having a bearing housing per bearing. The structure 130 may be a low cost structure designed to allow assembling the bearing housing 120 with two roller or ball bearings considerably spread apart one from the other on an exhaust structure of a gas turbine engine. As each of the flanges 132a, 134a of the connecting members 132, 134 is on a same side of the casing flanges 28c (e.g., left side in the embodiment shown), it is possible to install the bearing housing assembly 100 in a single common operation.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A bearing assembly for a gas turbine engine, the bearing assembly having a central axis and comprising at least two bearings being axially spaced from one another relative to the central axis and configured to rotatably support a rotating component of the gas turbine engine, a bearing housing including bearing supports supporting the at least two bearings, the bearing housing securable to a casing of the gas turbine engine via hairpin structures being axially spaced from one another, the hairpin structures protruding radially outwardly from the bearing supports, the bearing housing including a case extending circumferentially around the central axis and secured at opposed axial extremities thereof to the bearing supports.

2. The bearing assembly of claim 1, wherein the hairpin structures include flanges annularly extending around the central axis.

3. The bearing assembly of claim 2, wherein each of the flanges has an annular face facing in an axial direction relative to the central axis, the annular faces abuttable against flanges of the casing.

4. The bearing assembly of claim 2, wherein one of the flanges is secured to a corresponding one of the bearing supports via a flexible connector, the flexible connector allowing relative axial movements between the corresponding one of the bearing supports and the one of the flanges.

5. The bearing assembly of claim 1, wherein the hairpin structures include connecting members each being axially aligned with a respective one of the at least two bearings.

6. The bearing assembly of claim 1, wherein a stiffness of the bearing housing at one of the bearing supports supporting one of the at least two bearings is greater than a stiffness of the bearing housing at the other of the bearing supports supporting another of the at least two bearings.

7. The bearing assembly of claim 1, wherein the bearing housing is made of SST material and/or Waspalloy.

8. The bearing assembly of claim 1, wherein one of the hairpin structures is a flange protruding radially outwardly from a corresponding one of the bearing supports.

9. A gas turbine engine comprising a bearing housing having a central axis and two bearings within the bearing housing axially spaced from one another relative to the central axis, the bearing housing secured to a casing of the gas turbine engine via a plurality of axially spaced hairpin structures, the bearing housing including bearing supports radially supporting the two bearings, the hairpin structures protruding radially outwardly from the bearing supports, the bearing housing including a case extending circumferentially around the central axis and secured at opposed axial extremities thereof to the bearing supports.

10. The gas turbine engine of claim 9, wherein the hairpin structures include flanges annularly extending around the central axis.

11. The gas turbine engine of claim 10, wherein each of the flanges has an annular face facing in an axial direction relative to the central axis, the annular faces in abutment against the casing.

12. The gas turbine engine of claim 10, wherein one of the flanges is secured to a corresponding one of the bearing supports of the bearing housing via a flexible connector, the flexible connector allowing relative axial movements between the corresponding one of the bearing supports and the one of the flanges.

13. The gas turbine engine of claim 9, wherein the hairpin structures include connecting members each being axially aligned with a respective one of the at least two bearings.

14. The gas turbine engine of claim 9, wherein a stiffness of the bearing housing at one of bearing supports supporting one of the at least two bearings is greater than a stiffness of the bearing housing at another of the bearing supports supporting the other of the at least two bearings.

15. The gas turbine engine of claim 9, wherein the bearing housing is made of SST material and/or Waspalloy.

16. The gas turbine engine of claim 9, wherein one of bearing supports of the bearing housing defines an annular surface oriented in a radial direction relative to the central axis, the annular surface in a sliding engagement against a flange of the casing.

17. The gas turbine engine of claim 9, wherein the casing defines attachment members being radially movable relative to the central axis, the hairpin structures secured to the attachment members.

18. The gas turbine engine of claim 9, wherein one of the hairpin structures includes a flange protruding radially outwardly from a corresponding one of bearing supports of the bearing housing.

19. A method of operating a bearing assembly of a gas turbine engine, comprising:
supporting at least two bearings via bearing supports of a bearing housing being axially spaced apart relative to a central axis;
receiving a first load at least at one of the at least two bearings and receiving a second load greater than the first load at the other of the at least two bearings; and
moving the bearing supports relative to one another with annular hairpin structures connecting the bearing housing to attachment members of a casing of the gas turbine engine and/or with the attachment members of the casing, the annular hairpin structures protruding radially outwardly from the bearing supports, the bearing housing including a case extending circumferentially around the central axis and secured at opposed axial extremities thereof to the bearing supports.

20. The method of claim 19, wherein moving the bearing supports to move one relative to the other includes allowing relative radial movements between the bearing supports.

\* \* \* \* \*